US012686975B1

(12) United States Patent
Getz et al.

(10) Patent No.: US 12,686,975 B1
(45) Date of Patent: Jul. 21, 2026

(54) SMART SUSTAINABLE ROAD BASE SYSTEM AND METHOD OF CONSTRUCTING

(71) Applicant: TOTAL TIRE RECYCLING, LLC, Houston, TX (US)

(72) Inventors: Michael F. Getz, Pearland, TX (US); Donal P. Wadleigh, Seabrook, TX (US); John R. Koonce, Baytown, TX (US)

(73) Assignee: TOTAL TIRE RECYCLING, LLC, Houston, TX (US)

( * ) Notice: Subject to any disclaimer, the term of this patent is extended or adjusted under 35 U.S.C. 154(b) by 0 days.

(21) Appl. No.: 19/391,693

(22) Filed: Nov. 17, 2025

Related U.S. Application Data

(60) Provisional application No. 63/882,788, filed on Sep. 16, 2025.

(51) Int. Cl.
E01C 3/00 (2006.01)
H02N 2/18 (2006.01)
H02S 20/21 (2014.01)

(52) U.S. Cl.
CPC ............. E01C 3/003 (2013.01); H02N 2/186 (2013.01); H02S 20/21 (2014.12)

(58) Field of Classification Search
CPC .......... E01C 3/003; H02N 2/186; H02S 20/21
USPC ....................................... 404/28, 30, 31, 72
See application file for complete search history.

(56) References Cited

U.S. PATENT DOCUMENTS

| | | | |
|---|---|---|---|
| 3,870,422 A | * | 3/1975 | Medico, Jr. ............. E01C 7/142 404/31 |
| 4,188,153 A | * | 2/1980 | Taylor ....................... E02B 3/12 52/DIG. 9 |
| 4,801,217 A | * | 1/1989 | Goldberg .................. F42D 5/05 47/1.01 R |
| 4,850,738 A | | 7/1989 | Niemi |

(Continued)

FOREIGN PATENT DOCUMENTS

| | | | | |
|---|---|---|---|---|
| FR | 1398975 A | * | 5/1965 | ............. E02D 29/02 |
| KR | 101934537 B1 | | 1/2019 | |
| WO | 2018141026 A1 | | 8/2018 | |

OTHER PUBLICATIONS

Geosystems, Geoweb® Geocells, Retrieved From Internet, Retrieved on Nov. 17, 2025, <URL: https://libertytire.com/Applications/Construction/>.

(Continued)

*Primary Examiner* — Raymond W Addie

(57) ABSTRACT

A sustainable road base system and method of constructing said system on any surface. The sustainable road base system seeks to provide users with a road base that holds rock aggregate inside tire tread-ring containers. The ring containers form cylindrical elements and are arranged along a surface to provide support to various sized roads, both pervious and impervious. A geotextile stabilizes the sub-grade soil below the cylindrical elements and also prevents potential tire leaching. Additionally, tire fasteners enable the cylindrical elements to stay arranged within a honeycomb shaped grid during the aggregate spreading process or during times of load bearing. The pervious wearing surface in lieu of an impervious surface eliminates or reduces the need for retention ponds and stormwater basins on adjacent property.

14 Claims, 8 Drawing Sheets

(56)                References Cited

U.S. PATENT DOCUMENTS

| | | | | |
|---|---|---|---|---|
| 5,123,778 | A * | 6/1992 | Bohnhoff | E01C 11/18 |
| | | | | 404/31 |
| 5,846,021 | A * | 12/1998 | Bailey | E01C 3/006 |
| | | | | 52/DIG. 9 |
| 6,197,395 | B1 * | 3/2001 | Van Vechten | F16L 9/14 |
| | | | | 428/34.4 |
| 6,457,912 | B1 * | 10/2002 | Leibl | E01C 3/003 |
| | | | | 404/31 |
| 6,705,803 | B2 * | 3/2004 | Callinan | E02D 17/205 |
| | | | | 52/DIG. 9 |
| 7,470,092 | B2 | 12/2008 | Bonasso | |
| 8,080,901 | B2 * | 12/2011 | Doraisamy | H02N 2/18 |
| | | | | 290/1 R |
| 8,807,878 | B2 | 8/2014 | Freitag et al. | |
| 10,726,719 | B1 * | 7/2020 | Cheng | H10N 30/702 |
| 2003/0103808 | A1 | 6/2003 | Dolan | |
| 2006/0159526 | A1 | 7/2006 | Bonasso | |
| 2007/0223996 | A1 * | 9/2007 | Green | G08G 1/095 |
| | | | | 404/9 |
| 2008/0029925 | A1 | 2/2008 | Brown | |
| 2010/0109473 | A1 * | 5/2010 | Peterson | H02N 11/002 |
| | | | | 310/306 |
| 2010/0148519 | A1 * | 6/2010 | Shih | H10N 30/306 |
| | | | | 290/1 R |
| 2011/0091275 | A1 | 4/2011 | Lindenbaum | |
| 2015/0142369 | A1 * | 5/2015 | Alawi | E02D 1/08 |
| | | | | 702/137 |
| 2016/0218643 | A1 * | 7/2016 | Abu Al-Rubb | H02N 2/181 |
| 2018/0102730 | A1 | 4/2018 | Brusaw et al. | |
| 2021/0079599 | A1 * | 3/2021 | Corcoran | E01C 7/187 |
| 2021/0087772 | A1 * | 3/2021 | Banuelos | B32B 5/30 |
| 2023/0010909 | A1 | 1/2023 | Chen et al. | |
| 2024/0141602 | A1 * | 5/2024 | Nowak | E01C 23/065 |
| 2024/0218609 | A1 * | 7/2024 | Leung | E01C 3/003 |
| 2025/0080012 | A1 * | 3/2025 | Ouakka | H02N 2/22 |

OTHER PUBLICATIONS

Liberty Tire Recycling, Recycled Tire Rubber: Construct with Confidence, Retrieved From Internet, Retrieved on Nov. 17, 2025, <URL: https://www.prestogeo.com/products/soil-stabilization/geoweb-geocells/>.

* cited by examiner

SMART SUSTAINABLE ROAD BASE SYSTEM AND METHOD OF CONSTRUCTING

FIELD OF THE INVENTION

The present invention relates generally to a structural foundation and support system. More specifically, the present invention is a sustainable system and method or a road base that utilizes recycled tire components, recycled aggregate, organic geotextile fabrics, energy-generating materials and integrated monitoring.

BACKGROUND OF THE INVENTION

Roadways ranging in size from 4″ cart paths to 24″ major highways—all have potholes, ruts, cracks and upheavals that are very dangerous to drivers and vehicles. These are all caused by voids in the underlying road base where rock aggregate has washed out overtime primarily from seeping water, freeze-thaw cycles and heavy traffic.

One billion scrap tires are dumped into landfills or dumped illegally around the world every year. In the United States alone, about one scrap tire per person is generated annually. Scrap tires represent both a disposal problem and a resource opportunity. The cost of landfilling tires is energy intensive and costly to governments and to the environment, leading to stockpiling and open burning.

An objective of the present invention is to incentivize the redirection of waste tires by creating a better and longer lasting road while also reducing the emissions of standard road building methods which generate carbon credits for the user. The present invention intends to provide users with a system and method that reuses waste tires. For every one-acre of land where the present invention is used, more than 10,000 waste tires are repurposed and not disposed of in a landfill. In order to accomplish this, a preferred embodiment of the present invention comprises a plurality of cylindrical elements 1, including but not limited to tire 11 tread-ring aggregate containers, a geotextile 2, a plurality of tire fasteners 3, including but not limited to proprietary clips, nails, and clamps, and a pervious wearing surface. Thus, the present invention is a sustainable road base system and method that recycles tire 11 tread-rings into aggregate containers and the tire 11 sidewalls into an aggregate mixture 5.

DETAIL DESCRIPTIONS OF THE INVENTION

Figure 1:
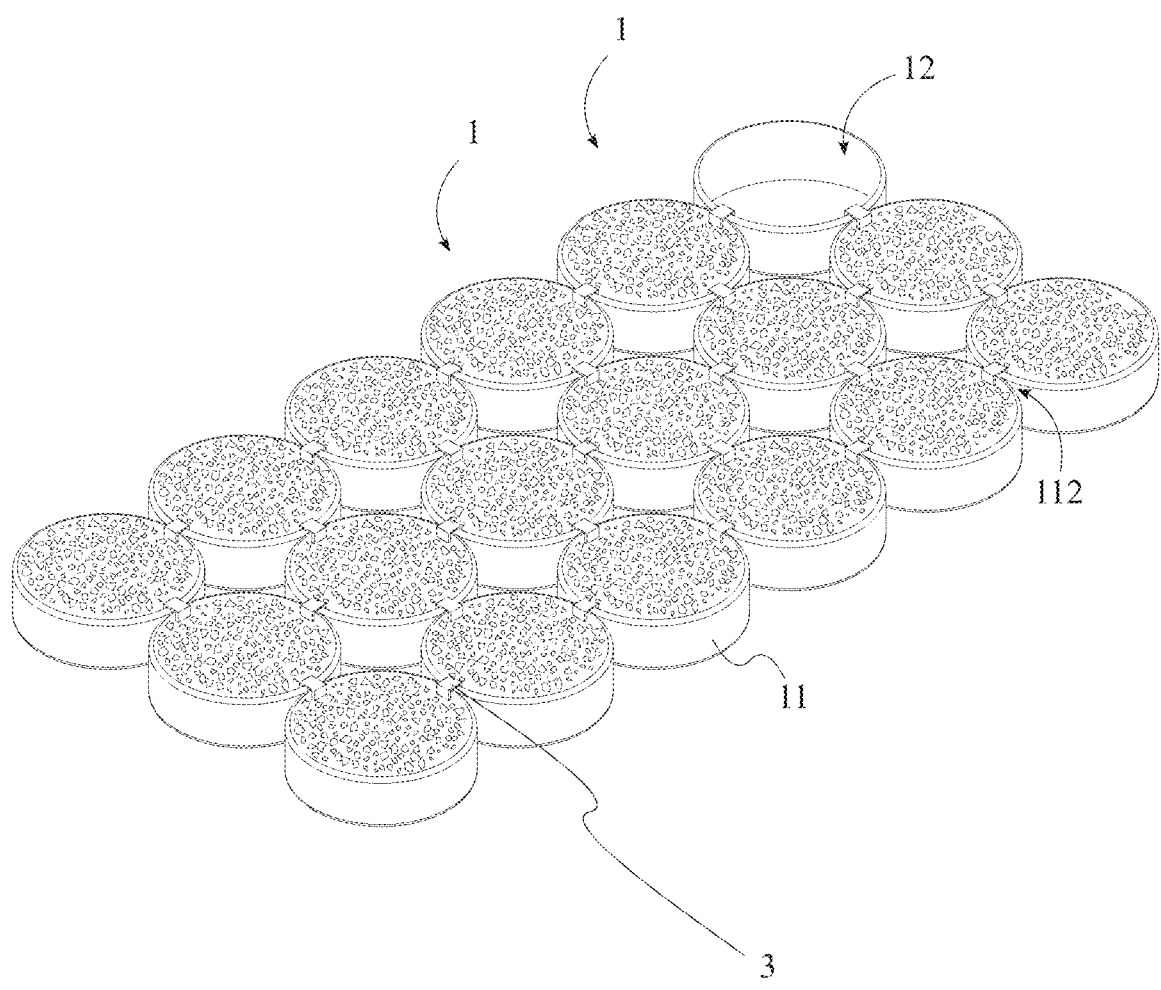
FIG. 1 is a perspective view of the present invention.

All illustrations of the drawings are for the purpose of describing selected versions of the present invention and are not intended to limit the scope of the present invention.

The present invention is a sustainable road base system and method of constructing that forms an environmentally friendly road base. The present invention seeks to provide users with a road base that confines rock aggregate inside tire 11—tread-ring containers. In order to accomplish this the present invention comprises a plurality of cylindrical elements 1 (tire 11 tread-rings) that are arranged along a surface to provide support to various sized roads, both pervious and impervious. Further, the geotextile 2 is designed to stabilize the subgrade soil below the plurality of cylindrical elements 1 and also prevents potential tire 11 leaching. Additionally, the plurality of tire fasteners 3 enable the plurality of cylindrical elements 1 to stay arranged within a honeycomb shaped grid especially during the aggregate spreading process. Further, when applying a pervious wearing surface in lieu of an impervious surface, the need for retention ponds and stormwater basins is reduced or eliminated on adjacent property. Thus, the present invention is a sustainable road base system and method that recycles the entire tire 11—the tire 11 tread-rings into aggregate containers (cylindrical elements 1) and the tire 11 sidewalls into an aggregate mixture 5.

As shown in FIG. 1-8, the present invention is a sustainable road base system and method of constructing said system. An objective of the present invention is to provide users with a strong road base that allows for good drainage while preventing washouts and potholes along the wearing surface. The present invention intends to provide users with a system and method that recycles tire 11 tread-rings into aggregate containers and the tire 11 sidewalls into an aggregate mixture 5 surrounding and within each of the plurality of cylindrical elements 1. To accomplish this the present invention comprises a plurality of cylindrical elements 1, a geotextile 2, a plurality of tire fasteners 3, and a pervious surface. Each of the plurality of cylindrical elements 1 comprises a tire 11 that forms a continuous tension ring 111 which defines a cylindrical cavity 12 therein. The empty space within the continuous tension ring 111 is the cylindrical cavity 12 configured to hold an aggregate mixture 5. Each of the plurality of cylindrical elements 1 is laid out in a grid formation on top of a geotextile 2. The plurality of cylindrical elements 1 arranged upon a surface, wherein the geotextile 2 is positioned above and/or below the plurality of cylindrical elements 1. The geotextile 2 is positioned between the plurality of cylindrical elements 1 and the sub-grade for carbon sequestration. Each of the plurality of tire fasteners 3 securing each of the plurality of cylindrical elements 1 to one another. Thus, the plurality of tire fasteners 3 mechanically fastens each of the plurality of cylindrical elements 1 to one another, to ensure they stay within a grid formation during an aggregate spreading process. An aggregate mixture 5 substantially fills inside and in between the plurality of cylindrical cavities, such that the plurality of cylindrical cavities provides a structural base. The aggregate mixture 5 comprises a tire derived aggregate 121, a recycled concrete aggregate 122, a recycled asphalt pavement 123, and a local aggregate 124. The top surface 4 is laid directly over the filled plurality of cylindrical elements 1. The top surface 4 is a pervious wearing surface and allows for liquid to pass through, reducing the need for retention ponds and stormwater basins on adjacent property. The top surface 4 completely covers the filled plurality of cylindrical elements 1. Thus, the present invention is a sustainable road base system and method that recycles tire 11 tread-rings into aggregate containers and recycles tire 11 sidewalls into an aggregate mixture 5.

The present invention is a smart sustainable road base of mechanical concrete that not only improves rural dirt roads, but provides AI sensors and embedded energy generation to urban streets and highways as well.

The plurality of cylindrical elements 1 is placed laterally on the ground in a grid as seen in FIG. 1. Each of the plurality of cylindrical elements 1 is a hollow cylindrical shape that forms a tension ring 111 due to the rubber material. Each of the plurality of cylindrical elements 1 is constructed from recycled tires 11 wherein the sidewalls of said tires 11 are removed from the tire 11 resulting in a tread-ring aggregate container. Each of the plurality of cylindrical elements 1 comprises a tire 11 tread, a cylindrical cavity 12, a plurality of sensors 13, and a plurality of energy generating materials 14. The tire 11 tread forms the ring shape enclosure and may have varying diameters of 4", 8" and 12". The 4" cylinders are utilized for light-weight surfaces like bike trails, cart paths, sidewalks and driveways. The 8" cylinders are used for streets, highways, and industrial yards. The load capacity supported by the 8" cylinders can be as high as 200 psi which is double the semi-truck load capacity (100 psi). The 12" cylinders are used primarily in railroad applications and other heavy duty industrial operations. Each size of cylinder requires a different machine to produce it.

The cylindrical cavity 12 is formed by the opening within the ring-shaped tire 11 tread. The cylindrical cavity 12 is configured to receive an aggregate mixture 5. The aggregate mixture 5 comprises tire derived aggregate 121 (TDA), recycled concrete aggregate 122 (RCA), recycled asphalt pavement 123 (RAP), and various sizes of other locally sourced aggregate 124. The sidewalls that are removed from the tire 11 are shredded and utilized to form the TDA 121 of varying sizes ranging from 0.5" to 2". The aggregate mixture 5 is preferably 20-40% TDA 121, 60-80% RCA 122/RAP 123/Local aggregate 124. To improve sustainability, solid, granular or semi-solid materials are used within a local aggregate 124 that forms a portion of the aggregate mixture 5. Biochar 21, which sequesters carbon and filters contaminants may also be mixed into the aggregate in areas where ground water leaching may be a concern.

Each of the plurality of cylindrical elements 1 further comprises a plurality of sensors 13 and a plurality of energy generating materials 14. The plurality of sensors 13 is integrated within the plurality of cylindrical elements 1. Preferably the plurality of sensors 13 comprises a strain gauge 131 and a moisture sensor 132. Each of the plurality of sensors 13 may further comprise a communication device 133 wherein each of the plurality of sensors 13 is equipped with said communication device 133 in order to send data to a mobile device or an online server. The plurality of sensors 13 are low-cost IoT sensors (e.g., strain gauges 131, moisture/accelerometers) and are embedded within the tire 11 tread or elsewhere within the road base enabling them to detect changes (e.g., cracks, water ingress) and transmit the data wirelessly (e.g., via Bluetooth/LoRa) to a cloud platform for predictive analytics. The data enables the owner to proactively plan road maintenance. Furthermore, the plurality of sensors 13 may interact with and receive power from the plurality of energy generating materials 14.

The plurality of energy generating materials 14 integrates within the plurality of cylindrical elements 1. The plurality of energy generating materials 14 is configured to cover each of the plurality of cylindrical elements 1 to generate electricity. The plurality of energy generating materials 14 comprising piezoelectric nanomaterials (e.g., flexible PVDF films) and photovoltaic layers that may generate electricity from vehicle vibrations and from UV sunlight on the top surface 4 above. The harvested energy from the plurality of energy generating materials 14 is then utilized to power the plurality of sensors 13 or any external devices (e.g., EV chargers, robotics, streetlights), which creates a self-sustaining road system. It should be further noted that the plurality of cylindrical elements 1 may be created in many various shapes and sizes and laid out in various configurations while still staying within the scope of the present invention.

Figure 2:
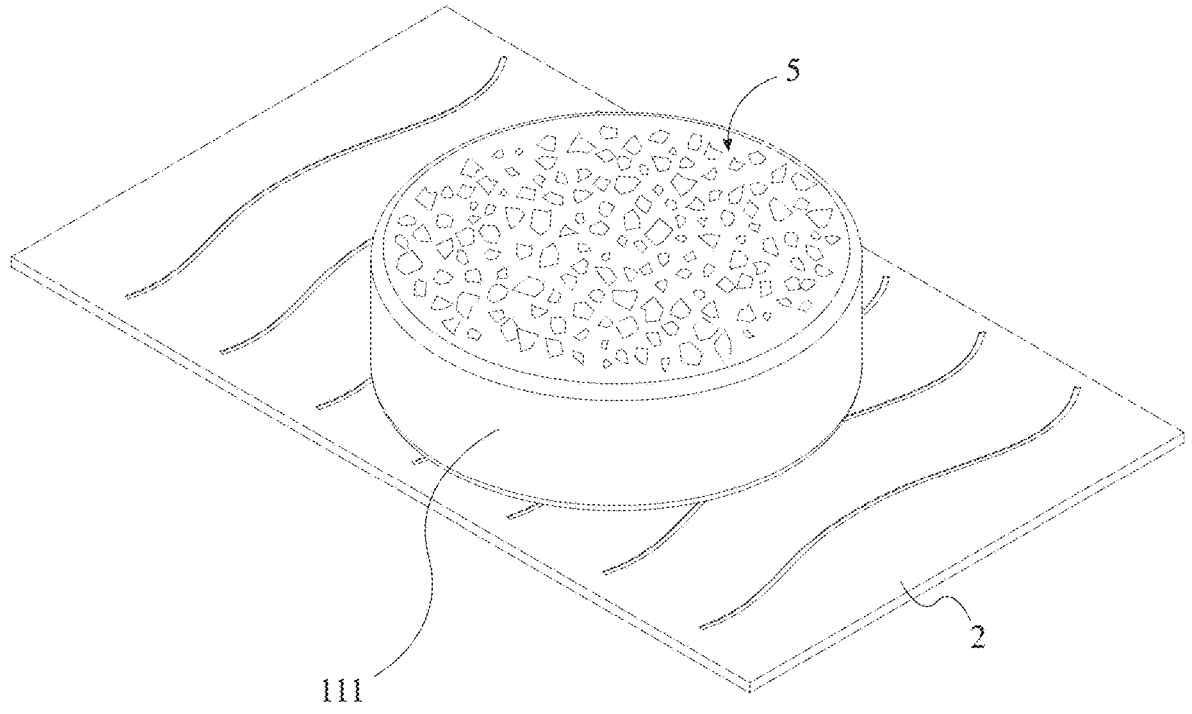
FIG. 2 is a perspective view of the present invention.
Figure 3:
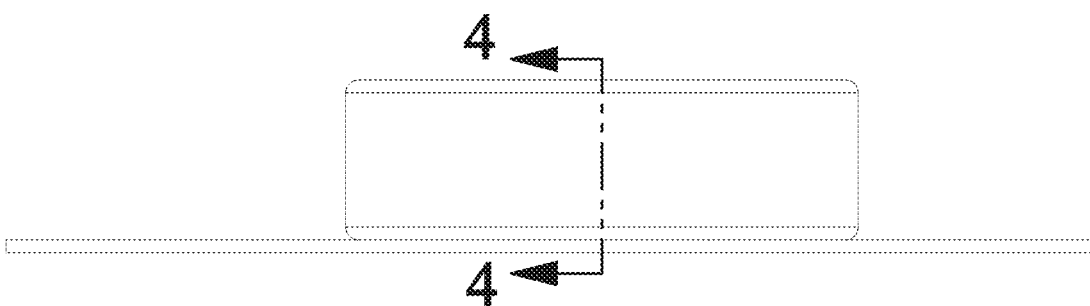
FIG. 3 is a side view of the present invention.
Figure 4:
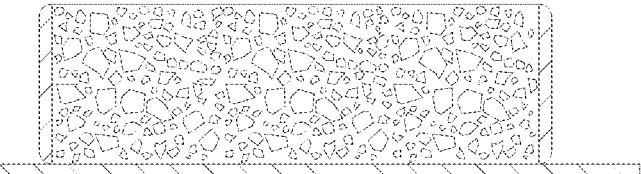
FIG. 4 is a cross-sectional view of the present invention.
Figure 5:
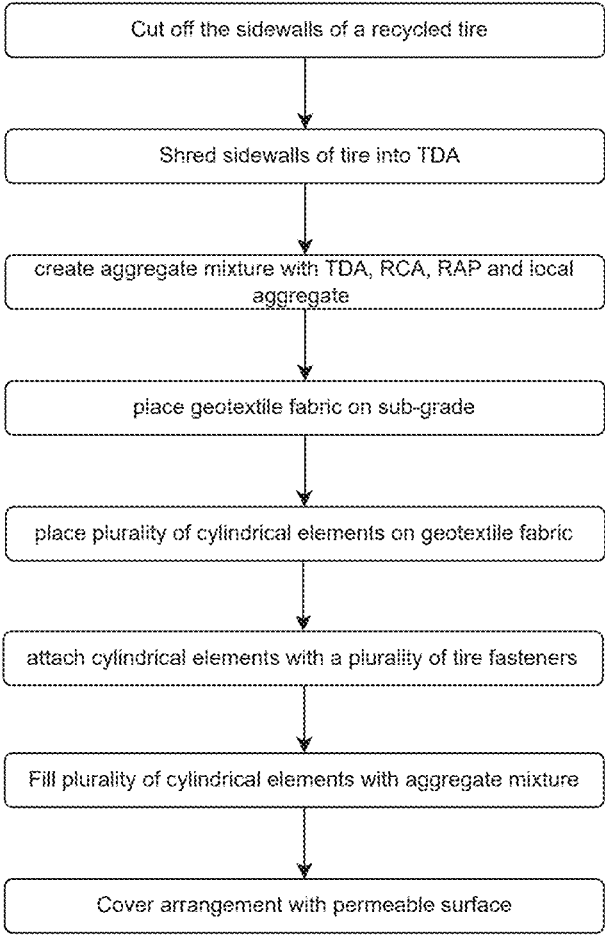
FIG. 5 is a flowchart of the present invention.

In its preferred embodiment a geotextile 2 is laid out on top of the subgrade soil, positioned below the arrangement of the plurality of cylindrical elements 1 as shown in FIG. 2. The geotextile 2 is a synthetic geotextile 2 fabric that is utilized to stabilize the subgrade soil and to prevent potential tire 11 leaching. For groundwater protection (e.g., below water table or per government regulations), the biochar 21 material is infused within the geotextile 2 resulting in a fabric that is organic to be used for carbon sequestration. Wherein, the geotextile 2 is 10-20% biochar 21 by weight. In an alternative embodiment the geotextile 2 may also be positioned above the plurality of cylindrical elements 1 as an optional layer of biochar-infused fabric for maximum surface water protection.

The plurality of tire fasteners 3 secures the plurality of cylindrical elements 1 together. Each of the plurality of tire fasteners 3 is a durable based structure that connects sides of two adjacent cylindrical elements 1 together. Each of the plurality of tire fasteners 3 may be hand squeezed to create a tension force, to hold each of the plurality of cylindrical elements 1 together. Each of the plurality of tire fasteners 3 comprises a plurality of teeth 31 opposite a hinging edge 32. Each of the plurality of tire fasteners 3 clamps around at least one portion 112 of the plurality of cylindrical elements 1 to provide a sturdier grip along each of the plurality of cylindrical elements 1. The plurality of teeth 31 engages into at least one portion 112 of the plurality of cylindrical elements 1. In an alternative embodiment 1.5" galvanized strapping nails may be utilized to secure two adjacent cylindrical elements 1 together.

The pervious surface is positioned along the top of the plurality of cylindrical elements 1 after they are filled and covered with aggregate. If the pervious wearing surface is installed instead of an impervious surface such as concrete, the need for government-imposed retention ponds and stormwater basins on the property may be reduced or eliminated altogether. Furthermore, the pervious wearing surface is loadbearing without sacrificing drainage capacity. In an alternative embodiment an impervious surface may be positioned along the top of the plurality of cylindrical elements 1 in place of or in addition to the pervious surface.

Figure 6:
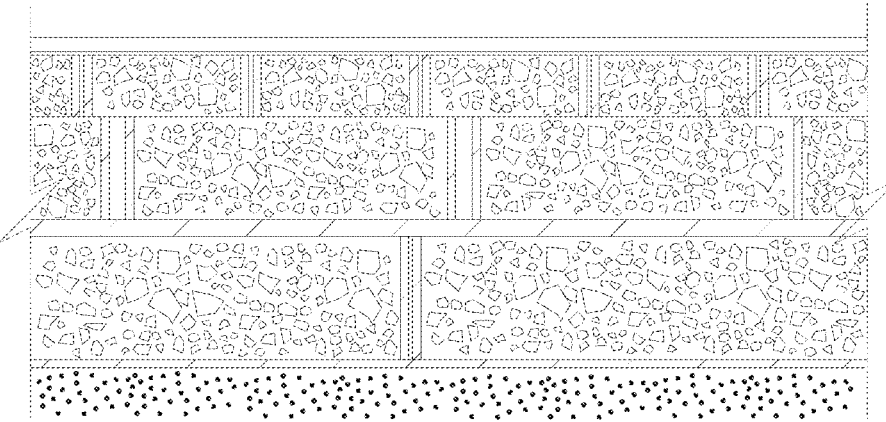
FIG. 6 is an example diagram of the layout of the system of the present invention.
Figure 7:
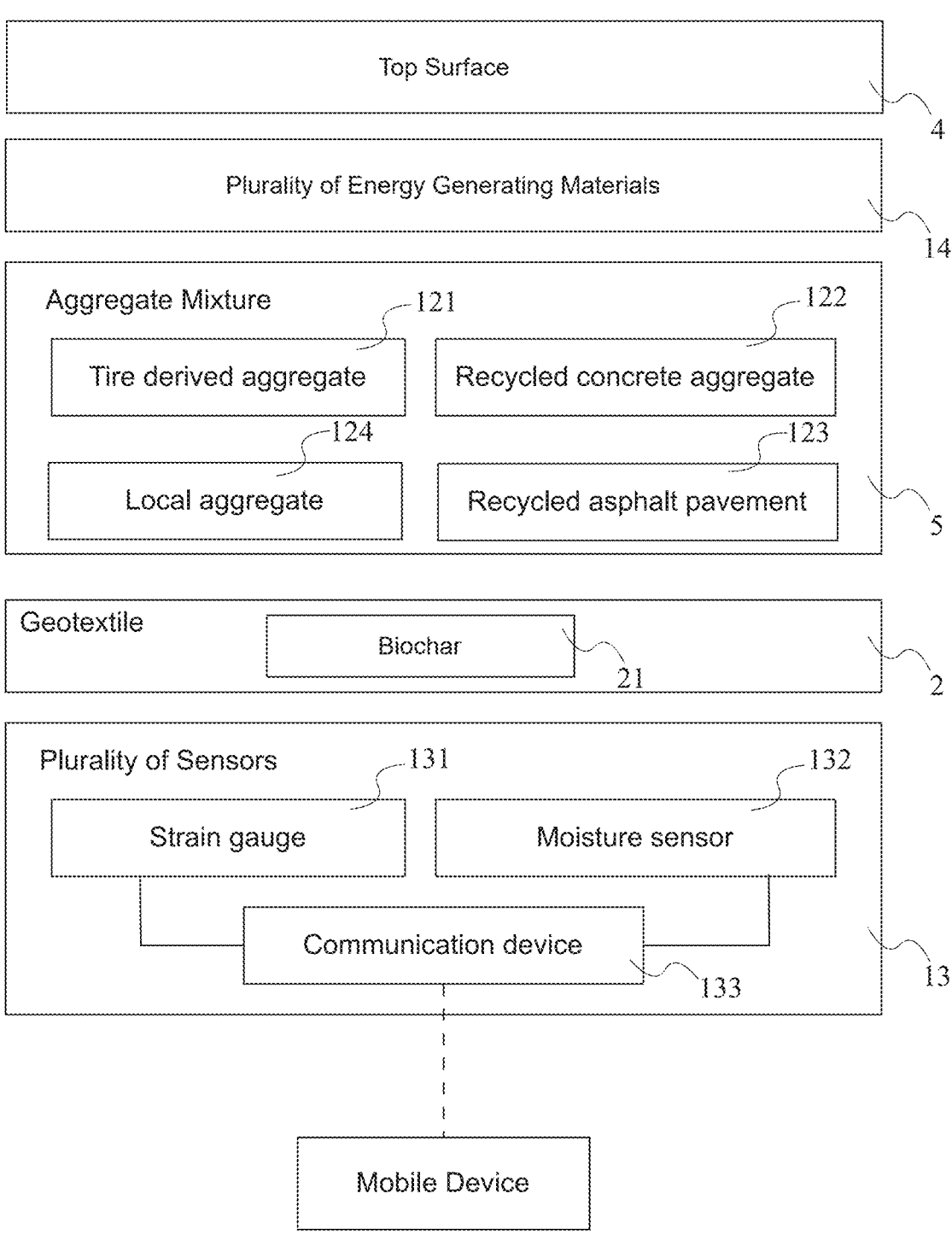
FIG. 7 is a block diagram of the present invention.
Figure 8:
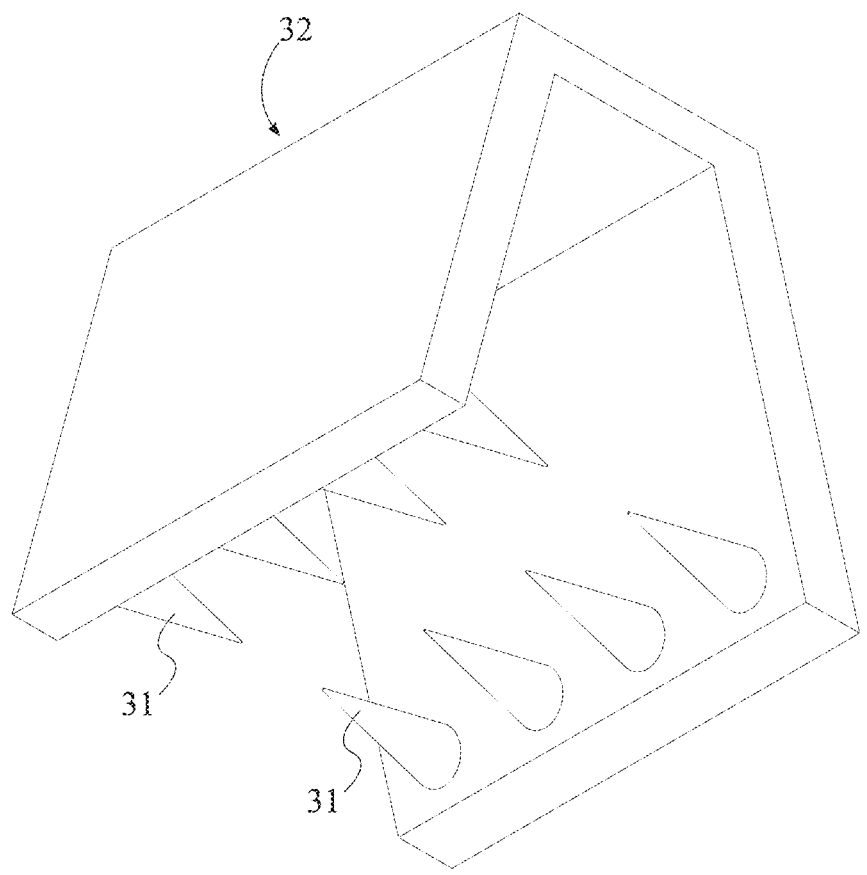
FIG. 8 is one of the plurality of tire fasteners.

In its preferred embodiment the present invention is formed by cutting off the sidewalls of a recycled or used tire 11 to form a cylindrical element (a tire 11 tread-ring aggregate container). The removed sidewalls are then shredded to form the TDA 121. The TDA 121 is then mixed with RCA 122, RAP 123, and various sizes of other locally sourced aggregate 124 to form an aggregate mixture 5. At this stage a pre-treated rubber additive may be added for enhanced asphalt integration. The pre-treated rubber additive may be incorporated into the aggregate fill or the top surface 4 to improve asphalt mixtures. This additive streamlines the blending of rubber into asphalt, resulting in a high-quality surface that resists cracking, rutting, and weather damage while maintaining the system's aggregate confinement properties. The local aggregate 124 may be road construction material such as crushed limestone, #411, #57, and #67 rock, sand, gravel, caliche, sandstone, shale, lava rock, slag and other readily available aggregate near the jobsite. Using local aggregate 124 near the jobsite saves money and time on transportation costs and staging the job. The geotextile 2 fabric is placed on top of the subgrade soil in the desired location. The plurality of cylindrical elements 1 is then placed in a desired arrangement on top of the geotextile 2 fabric. An AI algorithm (e.g., machine learning model using neural networks) simulates cylinder arrangement based on inputs (e.g., soil type, slope, traffic load via finite element analysis). The AI algorithm outputs patterns (e.g., variable densities) and aggregate ratios, minimizing waste and enhancing stability. An autonomous robotic arm may be deployed to place the plurality of cylindrical elements 1. The plurality of tire fasteners 3 is then secured to the plurality of cylindrical elements 1 to prevent the plurality of cylindrical elements 1 from moving laterally, which would reduce the structural integrity. The aggregate mixture 5 is then poured into and around each of the plurality of cylindrical elements 1. Optionally another geotextile 2 fabric is placed above the plurality of cylindrical elements 1. Finally, the pervious wearing surface is laid out along the top of the plurality of cylindrical elements 1 to finish forming a sustainable road structure. Alternatively, to support heavy loads, multiple layers of the plurality of cylindrical elements 1 may be used. One layer of the 4" plurality of cylindrical elements 1 is placed above two layers of the 8" plurality of cylindrical elements 1 to support heavy loads for industrial yard surfaces where pipe is stored or where large forklifts are operated that create great torque pressure on the surface. Additionally, for support of massive structures such as railroad trestles, drilling rigs and boom cranes, the bottom layer of 8" plurality of cylindrical elements 1 mentioned above should be replaced with the larger 12" plurality of cylindrical elements 1 below the layers of 4" and 8" plurality of cylindrical elements 1 as shown in FIG. 6. Newly engineered combinations of the plurality of cylindrical elements 1 sizes may be used to support different surfaces.

Furthermore, for unpaved roads in rural applications, the plurality of cylindrical elements 1 may be laid directly on the ground surface (the standard road subgrade) and then attached with the plurality of fasteners. The plurality of cylindrical elements 1 are filled and covered with gravel, dirt, and in some cases caliche. Alternatively, the plurality of cylindrical elements 1 are filled with RCA 122 and then covered with 2" of milled RAP 123.

For roads in excessively arid/dry climate States (such as Arizona, West Texas, New Mexico et.al.), where maximum compaction is desired (without having to use roller machinery), an aggregate like recycled concrete, crusher run, #411 stone, and sand—all with smaller particles and probable "fines" is preferred. For roads in excessively wet climate States (such as Hawaii, Alaska, and Southeastern States—Louisiana, Mississippi, Florida et.al) where drainage is important, a "clean" aggregate with more uniformly graded, angular stone such as #57 and #67 rock is preferable.

In an alternative embodiment the present invention may be utilized and configured as a portable road or surface base for temporary drilling sites, rig pads, and other industrial work locations such as "strong backs" and/or "dance floors". Unlike conventional road bases, the present invention may be removed and reused. This mobile road base system solves the problems of short-lived oil and gas rig drilling pads, ROW pipeline and temporary road construction locations. The portability is created when the plurality of cylindrical elements 1 are secured together by a strand of cable "snaked" in & out of each of the cylindrical elements 1 and tightened with a turnbuckle to hold them in place in sections. The cable allows for easy transporting of entire sections of cylindrical elements 1 with a backhoe hooking onto the cable and dragging the tires 11 out of the road base. Sections of cylindrical elements 1 are grouped in the road base by dimensions of approximately 48 feet in length by 8 feet in width. Each section may then be stacked onto a standard flatbed truck for easy portability to the next drilling or industrial job site. This solves a problem for oil and gas drilling rigs that are moved between locations and need a stable surface base.

With all the components working in tandem with each other it can be seen that the present invention is a sustainable road base system and method that recycles tire 11 tread-rings into aggregate containers and the tire 11 sidewalls into an aggregate mixture 5.

Although the invention has been explained in relation to its preferred embodiment, it is to be understood that many other possible modifications and variations can be made without departing from the spirit and scope of the invention as hereinafter claimed.

What is claimed is:

1. A smart sustainable road base system comprising:
a plurality of cylindrical elements;
a geotextile;
a plurality of tire fasteners;
a top surface;
each of the plurality of cylindrical elements comprising a tire that forms a continuous tension ring which defines a cylindrical cavity therein;
each of the plurality of tire fasteners securing each of the plurality of cylindrical elements to one another;
a mixture of particles substantially filling inside and in between the plurality of cylindrical cavities;
the plurality of cylindrical elements arranged upon a surface, wherein the geotextile is positioned above and/or below the plurality of cylindrical elements;
the top surface laid directly over the filled plurality of cylindrical elements;
the top surface completely covering the filled plurality of cylindrical elements; and
each of the plurality of cylindrical elements comprising a plurality of sensors and a plurality of energy generating materials.

2. The smart sustainable road base system as claimed in claim 1 wherein the mixture of particles comprising a tire derived aggregate, a recycled concrete aggregate, a recycled asphalt pavement, and a local aggregate.

3. The smart sustainable road base system as claimed in claim 1 wherein each of the plurality of cylindrical elements having a diameter of 12 inches.

4. The smart sustainable road base system as claimed in claim 1 comprising:
each of the plurality of sensors comprising a strain gauge, a moisture sensor, and a communication device;
the plurality of sensors integrating within the plurality of cylindrical elements;
the plurality of energy generating materials integrating within the plurality of cylindrical elements; and
the plurality of energy generating materials comprising piezoelectric nanomaterials and photovoltaic layers.

5. The smart sustainable road base system as claimed in claim 1 comprising:
the geotextile comprising a biochar material;
the biochar material being infused within the geotextile; and
wherein the geotextile is 10-20% biochar by weight.

6. The smart sustainable road base system as claimed in claim 1 comprising:
each of the plurality of tire fasteners comprising a plurality of teeth and a hinging edge;

each of the plurality of tire fasteners clamping around at least one portion of the plurality of cylindrical elements; and the plurality of teeth engaging into at least one portion of the plurality of cylindrical elements.

7. The smart sustainable road base system as claimed in claim 1 wherein each of the plurality of cylindrical elements having a diameter of 4 inches.

8. The smart sustainable road base system as claimed in claim 1 wherein each of the plurality of cylindrical elements having a diameter of 8 inches.

9. A smart sustainable road base system comprising:

a plurality of cylindrical elements;

a geotextile;

a plurality of tire fasteners;

a top surface;

each of the plurality of cylindrical elements comprising a tire that forms a continuous tension ring which defines a cylindrical cavity therein;

each of the plurality of tire fasteners securing each of the plurality of cylindrical elements to one another;

a mixture of particles substantially filling inside and in between the plurality of cylindrical cavities;

the plurality of cylindrical elements arranged upon a surface, wherein the geotextile is positioned between the plurality of cylindrical elements and the surface;

the top surface laid directly over the filled plurality of cylindrical elements;

the top surface completely covering the filled plurality of cylindrical elements;

the mixture of particles comprising a tire derived aggregate, a recycled concrete aggregate, a recycled asphalt pavement, and a local aggregate;

each of the plurality of cylindrical elements comprising a plurality of sensors and a plurality of energy generating materials; and each of the plurality of sensors comprising a strain gauge, a moisture sensor, and a communication device.

10. The smart sustainable road base system as claimed in claim 9 comprising:

the plurality of sensors integrating within the plurality of cylindrical elements;

the plurality of energy generating materials integrating within the plurality of cylindrical elements; and the plurality of energy generating materials comprising piezoelectric nanomaterials and photovoltaic layers.

11. The smart sustainable road base system as claimed in claim 9 comprising:

the geotextile comprising a biochar material;

the biochar material being infused within the geotextile;

wherein the geotextile is 10-20% biochar by weight;

each of the plurality of tire fasteners comprising a plurality of teeth and a hinging edge;

each of the plurality of tire fasteners clamping around at least one portion of the plurality of cylindrical elements; and the plurality of teeth engaging into at least one portion of the plurality of cylindrical elements.

12. The smart sustainable road base system as claimed in claim 9 wherein each of the plurality of cylindrical elements having a diameter of 4 inches.

13. The smart sustainable road base system as claimed in claim 9 wherein each of the plurality of cylindrical elements having a diameter of 8 inches.

14. The smart sustainable road base system as claimed in claim 9 wherein each of the plurality of cylindrical elements having a diameter of 12 inches.

\* \* \* \* \*